US009215668B2

(12) United States Patent
Jeon

(10) Patent No.: US 9,215,668 B2
(45) Date of Patent: Dec. 15, 2015

(54) APPARATUS AND METHOD FOR CONTROLLING UPLINK POWER IN A WIRELESS COMMUNICATION SYSTEM

(71) Applicant: Samsung Electronics Co. Ltd., Suwon-si, Gyeonggi-do (KR)

(72) Inventor: Young-Hyun Jeon, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 13/937,476

(22) Filed: Jul. 9, 2013

(65) Prior Publication Data
US 2014/0011535 A1    Jan. 9, 2014

(30) Foreign Application Priority Data

Jul. 9, 2012    (KR) .................. 10-2012-0074368

(51) Int. Cl.
*H04W 52/24*    (2009.01)
*H04W 52/40*    (2009.01)
(Continued)

(52) U.S. Cl.
CPC .......... *H04W 52/241* (2013.01); *H04W 52/40* (2013.01); *H04L 5/0035* (2013.01); *H04L 5/0073* (2013.01); *H04W 52/146* (2013.01); *H04W 52/243* (2013.01)

(58) Field of Classification Search
CPC . H04W 52/242; H04W 52/325; H04W 72/02; H04W 76/023; H04W 28/06
USPC ............... 455/522, 450, 452.1, 127.1, 127.5, 455/452.2
See application file for complete search history.

(56) References Cited

U.S. PATENT DOCUMENTS 8,494,006 B2 * 7/2013 Lee et al. .................... 370/482
8,798,021 B2 * 8/2014 Mangalvedhe et al. ....... 370/338
8,849,339 B2 * 9/2014 Anto et al. .................... 455/522

(Continued)

FOREIGN PATENT DOCUMENTS

EP    2 378 818 A2    10/2011

OTHER PUBLICATIONS

"Clustering methods for Base Station 1-8 Cooperation in LTE-A", 3rd Generation Partnership Project (3GPP), Aug. 19, 2011, XP050537839, Athens, Greece.

(Continued)

*Primary Examiner* — Minh D Dao
(74) *Attorney, Agent, or Firm* — Jefferson IP Law, LLP

(57) ABSTRACT

An apparatus and method for controlling uplink power considering inter-cell interference based on a cooperation transmission in a wireless communication system are provided. The method includes receiving inter-cell cooperation information, which includes uplink channel information and resource allocation information of the terminal located in a service area of each access node, from each of the access nodes, generating an uplink transmission power control command of any access node based on the inter-cell cooperation information received from each of the access nodes, or configuring reference inter-cell cooperation by using the inter-cell cooperation information received from at least one cooperation access node which provides the inter-cell cooperation transmission for a certain terminal together with any access node, based on the inter-cell cooperation information received from each of the plural access nodes, and transmitting the generated transmission power control command or the configured reference inter-cell cooperation information to any access node.

12 Claims, 6 Drawing Sheets

(51) Int. Cl.
    *H04W 52/14*   (2009.01)
    *H04L 5/00*    (2006.01)

(56) References Cited

U.S. PATENT DOCUMENTS

| | | |
|---|---|---|
| 2010/0034151 A1 | 2/2010 | Alexiou et al. |
| 2010/0159841 A1* | 6/2010 | Barberis et al. ............ 455/67.11 |
| 2010/0233963 A1* | 9/2010 | Harada et al. ................ 455/63.3 |
| 2010/0248638 A1* | 9/2010 | Harada et al. .............. 455/67.11 |
| 2011/0070918 A1* | 3/2011 | Hafeez ......................... 455/522 |
| 2011/0176497 A1* | 7/2011 | Gopalakrishnan ............ 370/329 |
| 2011/0243009 A1* | 10/2011 | Chandrasekhar et al. .... 370/252 |
| 2011/0267997 A1* | 11/2011 | Seo et al. ...................... 370/280 |
| 2012/0087276 A1* | 4/2012 | Huang et al. .................. 370/253 |
| 2012/0113951 A1* | 5/2012 | Koo et al. ..................... 370/329 |
| 2012/0134338 A1* | 5/2012 | Ko et al. ....................... 370/330 |
| 2012/0189077 A1* | 7/2012 | Seo et al. ...................... 375/267 |
| 2013/0021932 A1* | 1/2013 | Damnjanovic et al. ....... 370/252 |
| 2014/0314042 A1* | 10/2014 | Kim et al. ..................... 370/329 |
| 2015/0029969 A1* | 1/2015 | Park et al. ..................... 370/329 |

OTHER PUBLICATIONS

3GPP TSG-RAN WG1 #51, R1 074850, Uplink Power Control for E-UTRA—Range and Representation of P0, Nov. 5-9, 2007, Jeju, KR.

* cited by examiner

APPARATUS AND METHOD FOR CONTROLLING UPLINK POWER IN A WIRELESS COMMUNICATION SYSTEM

PRIORITY

This application claims the benefit under 35 U.S.C. §119(a) of a Korean patent Application filed on Jul. 9, 2012 in the Korean Intellectual Property Office and assigned Serial No. 10-2012-0074368, the entire disclosure of which is hereby incorporated by reference.

BACKGROUND OF THE INVENTION

1. Field of the Invention

The present invention relates to an apparatus and method for controlling uplink power in a wireless communication system. More particularly, the present invention relates to an apparatus and method for controlling uplink power considering an interference between cells according to a cooperative transmission in a wireless communication system.

2. Description of the Related Art

A wireless communication system according to the related art employs a resource scheduling technique in order to efficiently use a limited radio resource. For example, the resource scheduling technique applied to the wireless communication system includes a resource allocation according to a transmission direction of data and a resource allocation considering reuse efficiency. Here, the resource allocation according to the transmission direction of the data includes a downlink resource allocation in which a resource is downlinked from a base station to a wireless terminal, and an uplink resource allocation in which a resource is uplinked from the wireless terminal to the base station. The resource allocation considering the reuse efficiency means that a resource in a service area of the wireless communication system is allocated considering an interference in an adjacent service area.

Representatively, the wireless communication system has employed techniques such as an Adaptive Modulation and Coding (AMC) scheme, a channel-sensitive scheduling scheme, and the like, in order to improve transmission efficiency.

The AMC scheme enables the wireless communication system to adjust an amount of transmission data according to a channel condition in order to transmit a large amount of information while maintaining a reception error probability at a desired level. For example, the AMC scheme can provide a scheduling for increasing or decreasing an amount of transmission data according to the channel condition.

The channel-sensitive scheduling scheme allows the wireless communication system to selectively provide service to a user, who has a superior channel condition, among several users. For example, the channel-sensitive scheduling scheme can relatively increases a system capacity since it enables the wireless communication system to selectively provide service to the user, who has the superior channel condition. The increase of the system capacity is generally referred to as a 'Multi-user Diversity gain'.

The AMC scheme and the channel-sensitive scheduling scheme are to receive partial channel condition information being fed back from a receiver, and apply an appropriate modulation and coding technique at the most efficient time determined depending on the received partial channel condition information.

Where the AMC scheme is used along with a Multiple Input Multiple Output (MIMO) transmission scheme, it is possible to include a function of determining the number of spatial layers or ranking to correspond to a transmitted signal. In this case, the AMC scheme not only considers a coding rate and a modulation scheme simply, but also considers how many layers the data is transmitted in by using the MIMO, when an optimal data rate is determined.

As described above, the wireless communication system based on a cellular network considers a reuse efficiency when the resource is allocated. For example, when an identical frequency is used in an adjacent cell, a serious interference is generated in a boundary region between the cells. When the interference between the cells is enabled to be a minimum while a resource allocation is established to increase a use efficiency of a resource, it can be understood that the reuse efficiency is improved.

Therefore, various techniques have been proposed in order to improve the reuse efficiency of a radio resource in the wireless communication system.

In a case of a wireless communication system (hereinafter, referred to as a Code Division Multiple Access (CDMA) system) using a CDMA scheme, a base station transmits predetermined data to all terminals, based on a data circuit transmission. Accordingly, the base station determines only a data transmission rate of all terminals in a service area thereof. For example, the base station simultaneously adjusts the data transmission rate of all the terminals in a cell upwardly or downwardly when the data transmission rate of each terminal is determined. That is, the data transmission rate of all the terminals is adjusted depending on an inter-cell interference, an intra-cell interference, and a magnitude of a Rise over Thermal (RoT).

It makes the magnitude of the RoT in each cell to be maintained to an appropriate level so that a coverage area of each cell can be regularly maintained and the data transmission rate of each terminal can be maintained to an appropriate level. Here, the RoT is defined as a ratio of thermal noise to electric power received from all the terminals to the base.

On the contrary, a next generation wireless communication system including a Long Term Evolution (LTE), etc. supports a function of notifying other cells of a magnitude of interference in one cell at an uplink. Accordingly, each terminal analyzes an intensity, i.e., a Reference Signal Received Power (RSRP), of a downlink signal received from adjacent cells except for a serving cell, and calculates a downlink path loss of the serving cell and the adjacent cells. Each terminal transmits information on the calculated downlink path loss to the base station. The base station can perform a handoff of a corresponding terminal and an interference control for other cells.

On the other hand, the next generation communication system uses an Orthogonal Frequency-Division Multiplexing (OFDM) scheme. Hereinafter, a wireless communication system using the OFDM scheme is referred to as an 'OFDM system'.

The OFDM system has only inter-cell interference, and has no intra-cell interference which is generated in the CDMA system. The reason is that the CDMA system distinguishes channels by using codes in an identical frequency band, while the OFDM system distinguishes channels by using subcarriers.

Accordingly, the next generation wireless communication system corresponding to the OFDM system should employ an electric power control technique different from that which the CDMA system employs to maintain an Interference over Thermal (IoT) at an appropriate level, in order to maintain the IoT below an appropriate level.

The electric power control technique which the wireless communication system generally has employed includes, for example, an Open-Loop scheme, a Closed-Loop scheme, and an Inter-Cell Interference Coordination (ICIC) scheme.

On the other hand, in the next generation wireless communication system corresponding to the OFDM system, not only an intra-cell interference but also an inter-cell interference must be considered in order to maintain the IoT of each cell below the appropriate level.

Therefore, the 3rd Generation Partnership Project (3GPP) LTE standard provision supports an ICIC scheme. The ICIC scheme adjusts a transmission power for each frequency resource considering a traffic and an interference of User Equipment (UEs) belonging to each cell for a long time.

Accordingly, the ICIC scheme prevents a signal from being transmitted through a certain frequency resource or decreases transmission power of a signal which uses the certain frequency resource, in an adjacent cell, thereby reducing an interference for the UE located on a boundary of a cell.

However, as described above, there is a limitation in that an inter-cell interference is reduced through a resource allocation and a transmission power control so as to improve a system capacity in a wireless communication system based on a cellular network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling transmission power for an uplink by using interference information on which a removal of an interference between cooperation cells is reflected in a wireless communication system supporting an inter-cell cooperation technique based on a Space Division Multiple Access (SDMA).

Further, another aspect of the present invention is to provide an apparatus and method for measuring an interference by using an intra-cell interference removal technique, based on a resource allocation condition for an uplink of cooperation cells, in order to control transmission power for an uplink in a wireless communication system supporting an inter-cell cooperation technique based on an SDMA.

Further, still another aspect of the present invention is to provide an apparatus and method for measuring an effective interference and a Signal to Interference plus Noise Ratio (SINR) for an uplink, based on a real-time uplink resource allocation information and an Uplink Reference Signal in cooperation cells, when an inter-cell cooperation technique based on an SDMA is carried out in an LTE communication system.

Furthermore, still another aspect of the present invention is to provide an apparatus and method for controlling an uplink transmission power of a wireless terminal, based on effective interference information and a presumed SINR value which are measured in real time, in an LTE communication system.

Furthermore, still another aspect of the present invention is to provide an apparatus and method for providing a target SINR value depending on real-time uplink interference measurement information and determining a command value of a Transmission Power Control (TPC) suitable for a closed-loop power control, in a wireless communication system using a Coordinated Multi-Point (CoMP) technique.

In accordance with an aspect of the present invention, an apparatus for controlling uplink power in a wireless communication system is provided. The apparatus for controlling uplink transmission power of a plurality of access nodes, in a wireless communication system including the plurality of access nodes which transmit signals to a terminal by an inter-cell cooperation based on a SDMA scheme, which includes: a receiver which receives inter-cell cooperation information, which includes uplink channel information and resource allocation information of the terminal located in a service area of each access node, from each of the access nodes, a processor which generates an uplink transmission power control command of any access node based on the inter-cell cooperation information received from each of the access nodes, or configures a reference inter-cell cooperation by using the inter-cell cooperation information received from at least one cooperation access node which provides the inter-cell cooperation transmission for the terminal together with any access node, and a transmission unit which transmits the transmission power control command generated by the processor or the reference inter-cell cooperation information configured by the processor to any access node.

The plurality of access nodes includes any access node and at least one cooperation access node.

In accordance with another aspect of the present invention, a method of controlling uplink power in a wireless communication system is provided. The method of controlling uplink transmission power of a plurality of access nodes using a radio resource control apparatus, in a wireless communication system including the plurality of access nodes which transmit signals to a terminal by an inter-cell cooperation based on a SDMA scheme, which includes: receiving inter-cell cooperation information, which includes uplink channel information and resource allocation information of the terminal located in a service area of each access node, from each of the access nodes, generating an uplink transmission power control command of any access node based on the inter-cell cooperation information received from each of the access nodes, or configuring reference inter-cell cooperation by using the inter-cell cooperation information received from at least one cooperation access node which provides the inter-cell cooperation transmission for a certain terminal together with any access node, based on the inter-cell cooperation information received from each of the plural access nodes, and transmitting the generated transmission power control command or the configured reference inter-cell cooperation information to any access node.

The plurality of access nodes includes any access node and at least one cooperation access node.

According to an exemplary embodiment of the present invention, it is possible to mitigate influence due to an interference between sectors in an identical base station or between an identical macro sectors in a wireless communication system having a cell cooperation structure based on a CoMP scenario. Particularly, an SINR is configured considering a real-time uplink interference of a wireless terminal and an intensity of a power control is determined in a wireless communication system, thereby performing an effective uplink transmission power control depending on an amount of real-time interference information.

On the other hand, effects obtained or predicted by the embodiments of the present invention will be directly or suggestively disclosed in the detailed description of the embodiment of the present invention. That is, various effects predicted according to the embodiments of the present invention will be disclosed in the detailed description of the embodiments of the present invention as follows.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
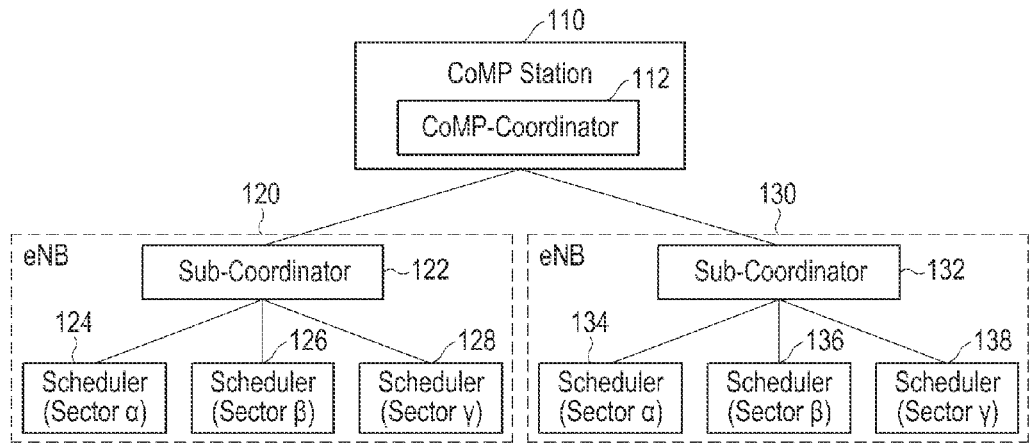
FIG. 1 is a view illustrating a configuration of a network layer according to a first or second exemplary embodiment of the present invention.

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an exemplary embodiment of the present invention will be described in order to solve the above-mentioned technical problem. Further, specific definitions found in the following description will be provided only to help general understanding of the present invention. However, it is understood that the definitions should not limit the scope of the present invention, and can be identically or easily applied to a system having a similar and technical background.

The exemplary embodiment of the present invention proposes a scheme of scheduling an uplink resource relating to a terminal (hereinafter, referred to as 'a boundary terminal') located on a boundary of a cell considering a temporary channel and traffic condition of the boundary terminal in a wireless communication system which uses a Coordinated Multi-Point (CoMP) technique based on an inter-cell cooperation in order to improve cell capacity.

The CoMP technique for use in the exemplary embodiment of the present invention may be classified into a coordinated scheduling scheme and a Joint Processing (JP) scheme.

The coordinated scheduling refers to an inter-cell cooperation scheduling. A CoMP scheme (hereinafter, referred to as 'CS/CB CoMP scheme) which is based on an Coordinated Beam forming (CS/CB) and is a representative example of the inter-cell cooperation scheduling, selects an antenna beam forming of a Base Station (BS), and is applied in order to improve capacity of the boundary terminal. For example, the BS selects the antenna beam forming so that each terminal receives a maximal signal from the BS, and a minimal signal from adjacent BSs.

To do this, the BS employing the CS/CB CoMP scheme transmits data only to terminals in its service area, while transmitting no data to terminals in a service area of an adjacent BS.

With the CoMP scheme based on the JP (hereinafter, referred to as 'JP CoMP'), the adjacent BSs simultaneously transmit identical information to the boundary terminal in order to improve capacity of the boundary terminal. On the other hand, the various BSs may simultaneously transmit a user signal to various terminals so as to improve capacity of entire cells. Accordingly, a cooperation BS supporting the JP CoMP scheme has to transmit data not only to the terminals which it serves, but also to the terminals which the adjacent BS serves.

On the other hand, the CoMP scheme can increasingly improve capacity of a cell and average capacity of the cell. However, in the CoMP scheme, the BS receives an increased amount of information through a backhaul for a BS cooperation. Therefore, a scheme of resolving a complicated calculation to process CoMP signals and a scheduling for a resource allocation should be provided.

In the exemplary embodiment of the present invention, a scenario (hereinafter, referred to as 'CoMP scenario) is considered in order to provide a scheme of controlling an uplink power in the wireless communication system which uses the CoMP scheme, as described below. With respect to the scenario (hereinafter, referred to as 'CoMP scenario) to be described and defined below, only three scenarios, to which the exemplary embodiment of the present invention is efficiently applied, among four scenarios which are defined by a relating standard, i.e., the Long Term Evolution (LTE) standard, will be described. The exemplary embodiment of the present invention will be applied to only the scenarios 1, 2 and 4 among the scenarios 1 to 4 defined by the LTE standard. For convenience, however, the scenarios 1, 2 and 4 defined by the standard will be changed to scenarios 1, 2 and 3 in the description for convenience in description.

With respect to the firstly considered CoMP scenario (hereinafter, referred to as 'CoMP scenario 1'), it is assumed that resource allocation information and channel information on sectors of an identical BS are shared in real time and a cell cooperation technique is performed depending on the information which can be shared in real time.

For example, it is assumed that three sectors located in the identical base station (eNB) are connected to an identical channel card. That is, cells (hereinafter, referred to as 'sector cells') respectively corresponding to each of the three sectors in the identical eNB are capable of sharing resource allocation information and channel information in real time. Therefore, it is possible to measure an interference for an uplink and to control power for the uplink in real time by using the cell cooperation technique (a cooperation scheduling and a removal of an inter-sector interference) based on the information which is shared. At this time, since only the cooperation information of the three sector cells is considered, it is easy to share the information on the cooperation cell in real time in view of implementation, although a performance of removing the interference is limited.

With respect to the secondly considered CoMP scenario (hereinafter, referred to as 'CoMP scenario 2'), it is assumed that in addition to the CoMP scenario 1, a plurality of BSs and a high-ranking apparatus, i.e., a high-ranking coordinator are connected by an optical interface.

Here, it is possible that all the eNBs and the sector cells connected to the high-ranking coordinator (CoMP coordinator) share resource allocation information and channel information in real time. Further, the cell cooperation technique (a cooperation scheduling and a removal of an inter-sector interference) can be performed, based on the information which can be shared. At this time, since only the cooperation information of the whole cooperation cells is considered, a performance of removing an interference can be maximized. From a viewpoint of the implementation, however, it is preferable to connect an interface among the eNBs by using an optical cable.

With respect to the thirdly considered CoMP scenario (hereinafter, referred to as 'CoMP scenario 3'), it is assumed that macro cells of an identical eNB and a plurality of cooperation sub-cells are connected to an identical channel card. For example, if a plurality of Radio-Remote-Heads (RRHs) connected to the macro cells which are subordinated to the identical eNB are operated, based on the SDMA scheme, one Radio Bearer (RB) resource can be spatially divided and a traffic for a plurality of terminals can be transmitted by carrying the traffic on one resource. To do this, it is possible to share resource allocation information and channel information in real time, and to perform a cell cooperation technique (a cooperation scheduling and a removal of an inter-sector interference) based on the information which can be shared. At this time, since the interference removal performance is determined considering only cooperation information of the whole RRH, the interference removal performance among the RRH in the macro cell can be maximized and the uplink interference control and the uplink power control for each sub-cell can be easily implemented.

As identified through the above-mentioned description, the cooperation cells have to share cooperation information, i.e., resource allocation information and uplink channel Sounding Reference Signal (SRS) information, of terminals, for which each cooperation cell performs a scheduling, in order to apply the CoMP scheme to the wireless communication system. Herein, not only the number of the antennas at a reception side which processes a cooperation cell signal, but also the number of the terminals which transmit a signal is increased. Accordingly, a freedom of space of a Multiple Input Multiple Output (MIMO) channel which is configured again to perform a known signal processing or a cooperative signal processing, is increased.

In other words, since the MIMO channel of an uplink based on the cooperation cell technique has higher ranking than independent channels of each cell, and performs a space-orthogonalization well, a receiver which performs a cell cooperation signal processing can effectively remove most interference by using a Minimum Mean Squared Error (MMSE) weight when the known signal is processed.

For example, where a first terminal shares a channel of one serving cell and another cooperation cell with a second terminal so as to receive an uplink signal through a cooperative transmission, an excessive interference may be measured.

The interference generated in the first terminal due to a signal transmitted from the second terminal can be removed by the weight according to the MMSE scheme. For example, a decoded signal is removed from the received signals, and reception intensity of residual signals is measured as signal intensity of Noise and Interference (NI). Accordingly, even though the signal received from the second terminal corresponds to a signal received and decoded by an uplink receiver or a modem, the signal is added as power to the interference which the first terminal suffers so that excessively higher interference may be measured because interference which the first terminal need not suffer is included in the interference. Accordingly, the receiver commands the terminal of a cooperation cell to decrease transmission power, in order to reduce the interference which is measured to a relatively high extent. In addition, the incorrect measurement of the amount of interference may have a bad effect on an interference control for a Self-Organizing Network (SON) function, a cell area control, or a resource allocation scheduling. Furthermore, it is difficult to maximize an advantage in an operation of the CoMP cell cooperation technique.

The reason is that the uplink receiver measures reception intensity of a signal which is regarded as noise, by removing only its signal decoded from the received whole signal as described above. Therefore, in order to address the above-mentioned problem, a scheme of controlling the uplink transmission power has to be provided considering inter-adjacent cell cooperation information, which has an effect on the receiver.

Herein, the exemplary embodiments of the present invention provide a scheme of sharing inter-adjacent cell cooperation information to a reference cell, and also provide a scheme of controlling uplink transmission power in each cell based on the shared inter-cell cooperation information.

The exemplary embodiments of the present invention provide a scheme of sharing the inter-cell cooperation information among a plurality of access nodes which performs a cooperation transmission in the wireless communication system, corresponding to each scenario.

Transmission Power Control (TPC) command for controlling the uplink transmission power is generated considering inter-cell cooperation information of adjacent access nodes, which is shared according to the scheme provided to correspond to each scenario, as well as the inter-cell cooperation information of serving access nodes.

As described above, the TPC command generated to correspond to each access node are transmitted to corresponding access nodes, so as to control the uplink transmission power of the corresponding access node. Otherwise, the inter-cell information collected from the adjacent access nodes is provided to each access node, so that each access node can directly control the uplink transmission power thereof.

Hereinafter, exemplary embodiments of the present invention will be described in detail with reference to the accompanying drawings.

FIG. 1 is a view illustrating a configuration of a network layer according to a first or second exemplary embodiment of the present invention, which is implemented in scenarios 1 and 2.

Referring to FIG. 1, one high-ranking layer (e.g., a CoMP station) 110 manages and controls a resource allocation in a plurality of low-ranking layers (e.g., eNBs) 120 and 130. Herein, the high-ranking layer 110 includes a high-ranking coordinator (e.g., CoMP coordinator) 112 as a radio resource control apparatus. The plurality of low-ranking layers 120 and 130 respectively includes respective low-ranking coordinators (e.g., a Sub-Coordinator) 122 and 132. The respective Sub-Coordinators 122 and 132 included each of the low-ranking layers 120 and 130 and manage and control a resource allocation for a plurality of schedulers 124, 126 and 128, or 134, 136 and 138. The plurality of schedulers 124, 126 and 128, or 134, 136 and 138 for which the resource allocation is managed and controlled by the respective Sub-Coordinators 122 and 132 is provided to correspond to each of three sectors (e.g., a sector α, a sector β, a sector γ among plural sectors.

The respective Sub-Coordinators 122 and 132 perform a cooperation scheduling among the sectors α, β and γ corresponding to a sector, i.e., a macro sector, which is subordinated to a high-ranking layer, for example a BS, of a local area.

One high-ranking layer 110 and the plural low-ranking layers 120 and 130 have the relationship of a master and a slave in the network. That is, in the network, the high-ranking layer 110 corresponds to the master, and the plural low-ranking layers 120 and 130 respectively correspond to the slave.

Accordingly, the respective low-ranking layers 120 and 130 collect inter-cell cooperation information from the plurality of schedulers 124, 126 and 128, or 134, 136 and 138 provided to the respective sectors α, β and γ corresponding to the subordinated macro sector. That is, the respective low-ranking layers 120 and 130 collect the inter-cell cooperation information including a uplink channel information used in each macro sector and a resource allocation information according to a resource allocation condition. Therefore, each low-ranking layer 120 or 130 can share the inter-cell cooperation information in the subordinated macro sector in real time.

On the other hand, each low-ranking layer 120 or 130 transmits the inter-cell cooperation information, which is collected from the subordinated macro sectors, to the identical high-ranking layer 110. Thereby, the high-ranking layer 110 can share the inter-cell information with the plurality of low-ranking layers 120 and 130. The inter-cell cooperation information shared by the plurality of low-ranking layers 120 and 130 corresponds to all the subordinated macro sectors as described above.

As described above, one high-ranking layer 110 can share the inter-cell cooperation information with all the subordinated low-ranking layers. Accordingly, the high-ranking layer 110 provides inter-cell cooperation information collected from other low-ranking layers adjacent to each low-ranking layer 122 or 132, or a TPC command determined for each low-ranking layer 122 or 132. At this time, the TPC command can be determined considering all the inter-cell cooperation information which is collected from a certain low-ranking layer and other low-ranking layers adjacent to the certain low-ranking layer.

Figure 2:
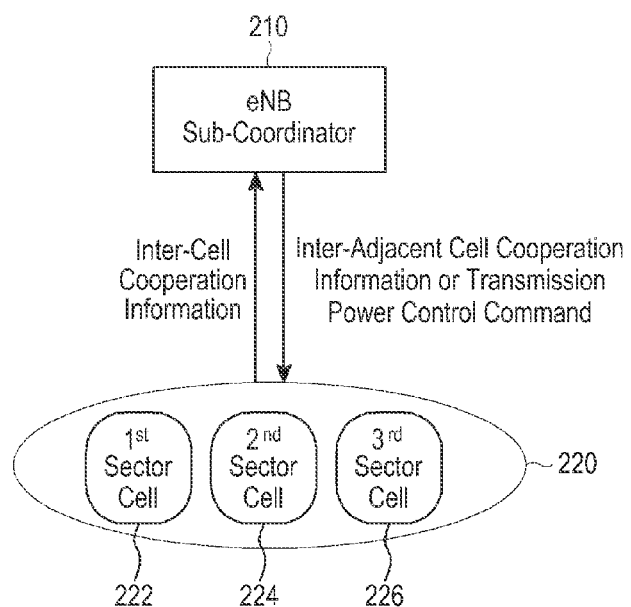
FIG. 2 is a view illustrating an example according to the first exemplary embodiment of the present invention.

FIG. 2 is a view illustrating an example according to the first exemplary embodiment of the present invention which is applied to the scenario 1.

Referring to FIG. 2, a Sub-Coordinator 210 located in an eNB shares inter-cell cooperation information among macro sectors 220 which are subordinated to the eNB to distinguish a service area. For example, since channel cards (e.g., Application Specific Integrated Circuit (ASIC) and Digital Signal Processor (DSP)) for the macro sectors 220 including a sector α, a sector β, and a sector γ are located in one eNB, it is possible to share the inter-cell cooperation information through an interface in a range of implementation.

More particularly, schedulers provided to correspond to each of the sectors α, β, and γ report the inter-cell information thereof to the Sub-Coordinator 210 located in the eNB in real time. At this time, the inter-cell cooperation information which is reported to the schedulers includes long-term information and short-term information. The long-term information corresponds to an SRS information, i.e., UpLink (UL) channel information, of serving User Equipments (UEs) located in a service area of the eNB, and the short term information corresponds to resource allocation information in the service area of the eNB.

As an example, the Sub-Coordinator 210 can collect the inter-cell information which is reported from the schedulers provided to each sector, and generate inter-adjacent cell cooperation information which is provided to each macro sector, based on the collected inter-cell cooperation information. For example, the Sub-Coordinator 210 generates the inter-adjacent cell cooperation information which is provided to the sector α 222, based on the inter-cell cooperation information which is collected from the sector β 224 and the sector γ 226, generates the inter-adjacent cell cooperation information which is provided to the sector β 224, based on the inter-cell cooperation information which is collected from the sector α 222 and the sector γ 226, and generates the inter-adjacent cooperation information which is provided to the sector γ 226, based on the inter-cell cooperation information which is collected from the sector α 222 and the sector β 224.

As another example, the Sub-Coordinator 210 can collect the inter-cell cooperation information which is reported from the schedulers provided to each of the macro sectors 220, and generate a TPC command to be provided to each of the macro sectors 220, based on the collected inter-cell cooperation information. For example, assuming that the sector α 222, the sector β 224 and the sector γ 226 are mutually adjacent to one another, the Sub-Coordinator generates the TPC command which is able to be provided to the sector α 222, based on the inter-cell cooperation information which is collected from the sector α 222, the sector β 224 and the sector γ 226. Further, the Sub-Coordinator generates the TPC command which is able to be provided to the sector β 224, based on the inter-cell cooperation information which is collected from the sector α 222, the sector β 224 and the sector γ 226. Also, the Sub-Coordinator generates the TPC command which is able to be provided to the sector γ 226, based on the inter-cell cooperation information which is collected from the sector α 222, the sector β 224 and the sector γ 226.

The Sub-Coordinator 210 provides the inter-cell cooperation information among the adjacent cells which is generated to correspond to each macro sector, or the TPC command to the schedulers provided to the corresponding macro sector, so that each scheduler can control the uplink transmission power.

The inter-cell cooperation information among the adjacent cells which is provided by the Sub-Coordinator 210 to each scheduler includes uplink channel information and resource allocation information in the adjacent cells. The TPC command which is provided by the Sub-Coordinator 210 to each scheduler corresponds to a command for instructing the scheduler to increase, decrease, or maintain the uplink transmission power in the corresponding macro sector.

On the other hand, the scheduler provided to each macro sector 220 calculates an effective Interference over Thermal noise (IoT) and an effective Signal to Interference Plus Noise Ratio (SINR) considering both the inter-cell cooperation information among the adjacent cells which is provided from the Sub-Coordinator 210 and the inter-cell cooperation information thereof, so as to perform a closed-loop power control.

As described above, if an interface between the eNBs is not defined, the scheduler which is subordinated to the Sub-Coordinator shares only the resource allocation information among the macro sectors in the eNB in the scenario 1, resulting in performing of the inter-cell cooperation scheduling in each eNB.

Figure 3:
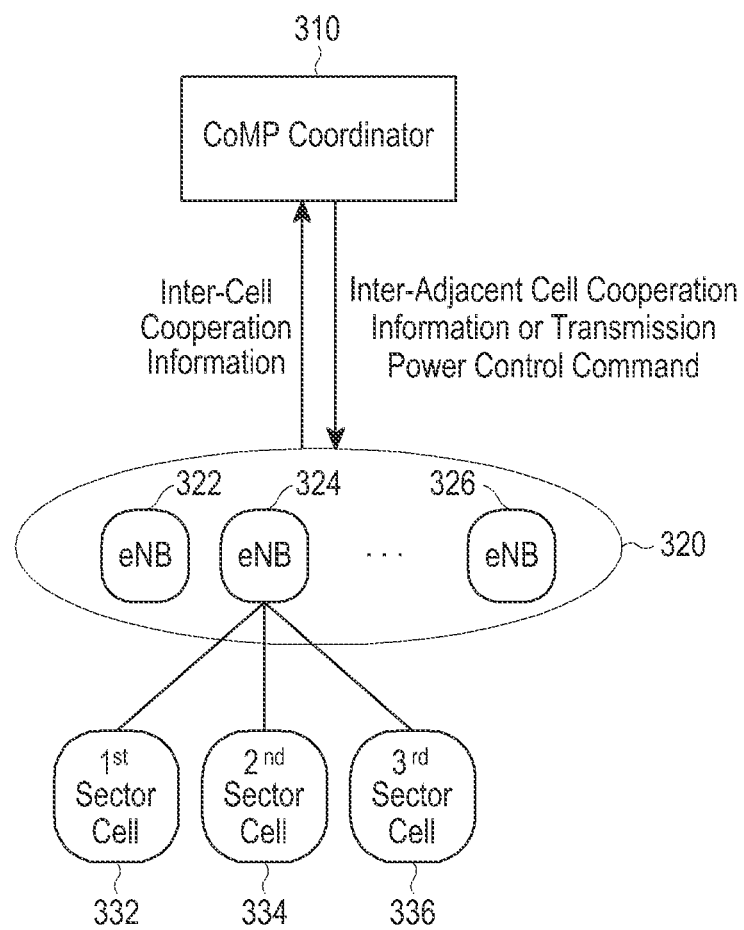
FIG. 3 is a view illustrating an example according to the second exemplary embodiment of the present invention.

FIG. 3 is a view illustrating an example according to the second exemplary embodiment of the present invention which is applied to the scenario 2.

Referring to FIG. 3, the CoMP Coordinator 310 shares inter-cell cooperation information which is reported from each of eNBs adjacent to one another. In order to share the inter-cell cooperation information in real time, it is preferable to connect Sub-Coordinators 322, 324 and 326 which are provided to each of the eNBs 320 adjacent to one another, by using a medium capable of performing an optical communication.

More particularly, the Sub-Coordinators which are provided to respectively correspond to each of a first eNB 322, a second eNB 324 and a third eNB 326, report inter-cell cooperation information of the macro cells which it manages, to the CoMP Coordinator 310 in real time. At this time, the inter-cell cooperation information which is reported by the Sub-Coordinators includes long-term information and short-term information. The long-term information corresponds to SRS information, i.e., UL channel information, of serving UEs located in a service area of each Sub-Coordinator, and the short-term information corresponds to resource allocation information in the service area of each Sub-Coordinator.

As an example, the CoMP Coordinator 310 can collect the inter-cell information which is reported from the Sub-Coordinator provided to each eNB, and generate inter-cell cooperation information on adjacent cells which is provided to each eNB, based on the collected inter-cell cooperation information. For example, the CoMP Coordinator 310 generates the inter-adjacent cooperation information which is provided to the first eNB 322, based on the inter-cell cooperation information which is collected from the second eNB 324 and the third eNB 326, generates the inter-adjacent cooperation information which is provided to the second eNB 324, based on the inter-cell cooperation information which is collected from the first eNB 322 and the second eNB 326, and generates the inter-adjacent cooperation information which is provided to the third eNB 326, based on the inter-cell cooperation information which is collected from the first eNB 322 and the third eNB 324.

As another example, the CoMP Coordinator 310 can collect the inter-cell cooperation information which is reported from the Sub-Coordinators provided to each of the eNBs, and generate a TPC command to be provided to each eNB, based on the collected inter-cell cooperation information. For example, assuming that the first, second and third eNBs 322, 324 and 326 are mutually adjacent to one another, the CoMP Coordinator generates the TPC command which is able to be provided to each of the first, second and third eNBs 322, 324 and 326, based on the inter-cell cooperation information which is collected from the first, second and third eNBs 322, 324 and 326.

The CoMP Coordinator 310 provides the inter-cell cooperation information among the adjacent cells which is generated to correspond to each eNB, or the TPC command to the Sub-Coordinators provided to the corresponding eNB, so that each Sub-Coordinator can control the uplink transmission power in the macro sectors which the Sub-Coordinator manage. It is previously described with reference to FIG. 2 that each Sub-Coordinators control the uplink transmission power in each macro sector.

The inter-cell cooperation information among the adjacent cells which is provided by the CoMP Coordinator 310 to each Sub-Coordinator includes uplink channel information and resource allocation information in the adjacent cells. The TPC command which is provided by the CoMP Coordinator 310 to each Sub-Coordinator correspond to a command for instructing the Sub-Coordinator to increase, decrease, or maintain the uplink transmission power in the macro sector (e.g., first sector cell 332, second sector cell 334, and third sector cell 336) located in the corresponding eNB (e.g., eNB 324).

On the other hand, the macro sector located in the corresponding eNB calculates an effective IoT and an effective SINR considering both the inter-cell cooperation information among the adjacent cells which is provided through the Sub-Coordinator 210 from the CoMP Coordinator 310 and the inter-cell cooperation information thereof, so as to perform a closed-loop power control.

As described above, if the eNBs share resource allocation information in real time in the scenario 2, the scheduler which is subordinated to the Sub-Coordinator performs the cell cooperation scheduling for each cell.

Figure 4:
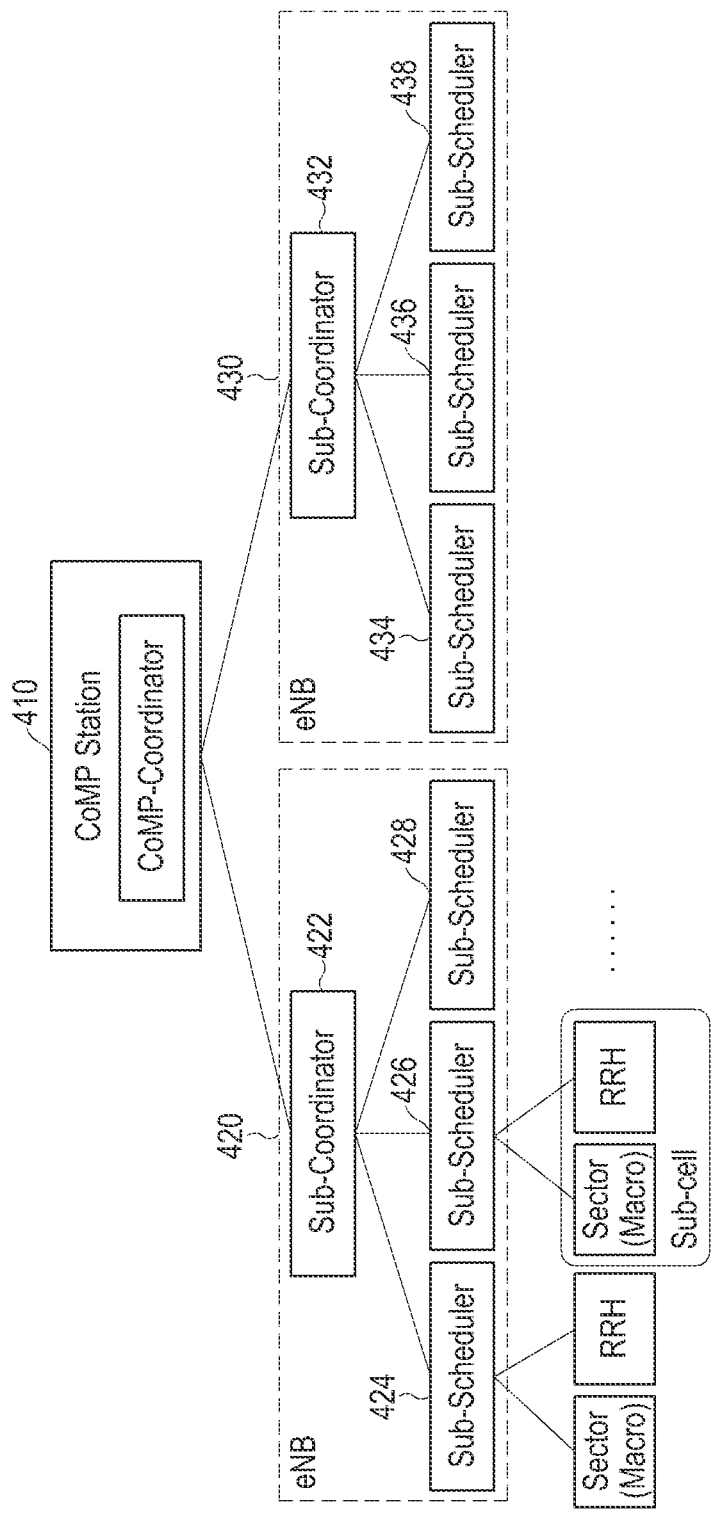
FIG. 4 is a view illustrating a configuration of a network layer according to a third exemplary embodiment of the present invention.

FIG. 4 is a view illustrating a configuration of a network layer according to a third exemplary embodiment of the present invention which is implemented in a scenario 3.

Referring to FIG. 4, a CoMP Station 410 manages and controls a resource allocation in Sub-Coordinators 422 and 432 respectively corresponding to each of eNBs 420 and 430, and the Sub-Coordinators 422 and 432 respectively manages and control a resource allocation to a plurality of schedulers 424, 426 and 428 or 434, 436 and 438. This configuration is identical to that shown in FIG. 1. In FIG. 4, a configuration having a name of 'scheduler' in FIG. 1 is merely changed to that under the name of 'Sub-Scheduler'.

However, since the scenario 3 is based on a Distributed Antenna System (DAS), the Sub-Scheduler manages and controls a resource allocation to a plurality of Sub-cells. Here, the Sub-cells respectively include a plurality of RRHs or at least one RRH and at least one macro cell.

Accordingly, the wireless communication system operates based on an interface and a network structure which includes the Sub-Schedulers 424, 426 and 428, or 434, 436 and 438 which take the responsibility for the resource allocation to the Sub-cells, the Sub-Coordinators 422 and 432 which manage and control the Sub-Schedulers, and the CoMP Station 410 which manages and controls the Sub-Coordinators 422 and 432.

Here, the Sub-Coordinators 422 and 432 help perform cooperation scheduling among macro sectors respectively corresponding to each of a sector $\alpha$, a sector $\beta$, and a sector $\gamma$ which are subordinated to an eNB in a local area. On the other hand, the CoMP Station 410 and the Sub-Coordinators 422 and 432 have the relationship of a master and a slave because of the network structure as shown in FIG. 4. That is, in the network, the Sub-Coordinators 422 and 432 correspond to the slave, and the CoMP station 410 corresponds to the master.

On the other hand, each Sub-Scheduler 424, 426, 428, 434, 436 and 438 collects inter-cell cooperation information from each macro cell or a RRH corresponding to a sub-cell. That is, each Sub-Scheduler collects the inter-cell cooperation information including uplink channel information which is used in each RRH or each macro cell, and resource allocation information according to a resource allocation condition. Therefore, each Sub-Scheduler 424, 426, 428, 434, 436 and 438 can share the inter-cell cooperation information with the subordinated RRHs or macro cells in real time.

The inter-cell cooperation information shared by the Sub-Schedulers 424, 426 and 428, or 434, 436 and 438 is provided to a high-ranking layer, i.e., the Sub-Coordinators 422 and 432, of the Sub-Schedulers. The Sub-Coordinator 422 or 432 transmits the inter-cell cooperation information which is collected from the Sub-Schedulers 424, 426 and 428, or 434, 436 and 438 to one CoMP Station 410. Accordingly, the high-ranking layer 410 can share the inter-cell cooperation information with the RHHs or the macro cells which correspond to the lowest end configuring the network.

As described above, one CoMP Station 410 can provide a TPC command which is determined to control the uplink transmission power of each RHH or each macro cell corresponding to the lowest end of the network. At this time, the TPC command may be determined considering all the inter-cell cooperation information which is collected from a certain low-ranking layer and other low-ranking layers adjacent to the certain low-ranking layer.

Figure 5:
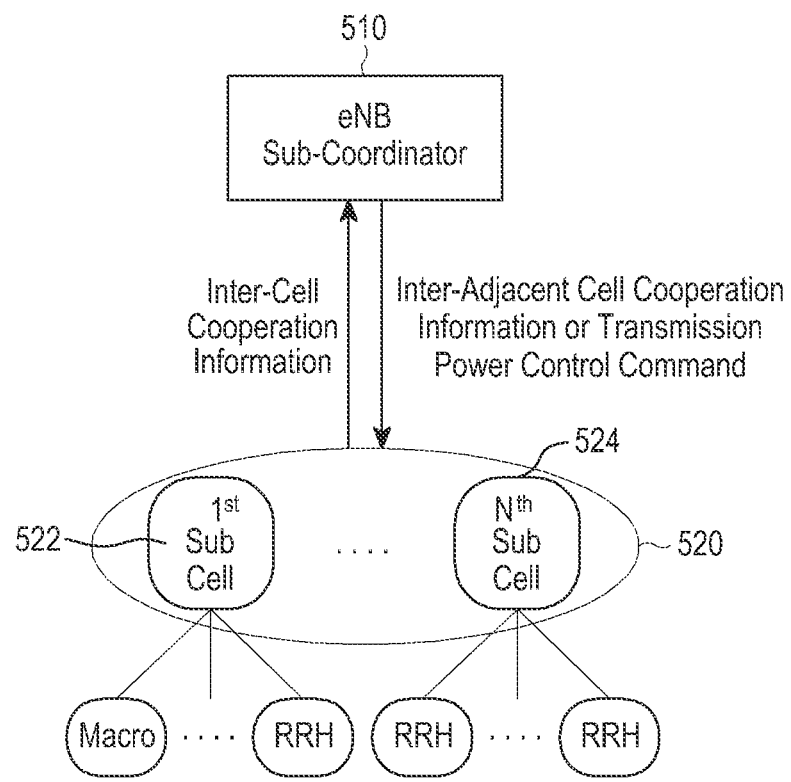
FIG. 5 is a view illustrating an example according to a fourth exemplary embodiment of the present invention.

FIG. 5 is a view illustrating an example according to a fourth exemplary embodiment of the present invention which is implemented in a scenario 4.

Referring to FIG. 5, a Sub-Coordinator 510 located in an eNB shares inter-cell cooperation information among sub-cells 520 which are subordinated to the eNB and distinguish a service area. For example, since channel cards (e.g. ASIC and DSP) of N sub cells 522 and 524 are located in one eNB, it is possible to share the inter-cell cooperation information through an interface in a range of implementation.

More particularly, N sub cells 522 and 524 respectively report their inter-cell cooperation information to the Sub-Coordinator 510 located in the eNB in real time. At this time, the inter-cell cooperation information reported by the sub cells includes long-term information and short-term information. The long-term information corresponds to SRS information, i.e., UL channel information, of serving UEs located in a service area of each sub cell, and the short-term information corresponds to resource allocation information in the service area of each sub cell.

On the other hand, the N sub cells 522 and 524 respectively include a plurality of RRHs, or at least one RRH and at least one macro sector, which are low-ranking layers, and share inter-cell cooperation information of the plural RRHs, or the at least one RRH and the at least one macro sector.

As an example, the Sub-Coordinator 510 collects the inter-cell cooperation information reported from each of the N sub cells 522 and 524, and generates inter-cell cooperation information among adjacent cells which is provided to each of the N sub cells 522 and 524, based on the collected inter-cell cooperation information.

As another example, the Sub-Coordinator 510 collects the inter-cell cooperation information reported from the N sub cells 522 and 524, and generates a TPC command which is provided to each of the N sub cells 522 and 524, based on the collected inter-cell cooperation information.

The Sub-Coordinator 510 provides the inter-cell cooperation information among the adjacent cells or the TPC command, which is generated to correspond to each of the N sub cells 522 and 524, resulting in the control of the uplink transmission power in each sub cell.

The inter-cell cooperation information among the adjacent cells which is provided to each sub cell by the Sub-Coordinator 510 includes uplink channel information and resource allocation information of the adjacent cells. The TPC command which is provided to each sub cell by the Sub-Coordinator 510 correspond to a command for instructing the Sub-Coordinator to increase, decrease, or maintain the uplink transmission power in the corresponding sub cell.

On the other hand, the sub cell calculates an effective IoT and an effective SINR considering all the inter-cell cooperation information among the adjacent cells which is provided from the Sub-Coordinator 510 and the inter-cell cooperation information thereof, and performs a closed-loop power control.

Figure 6:
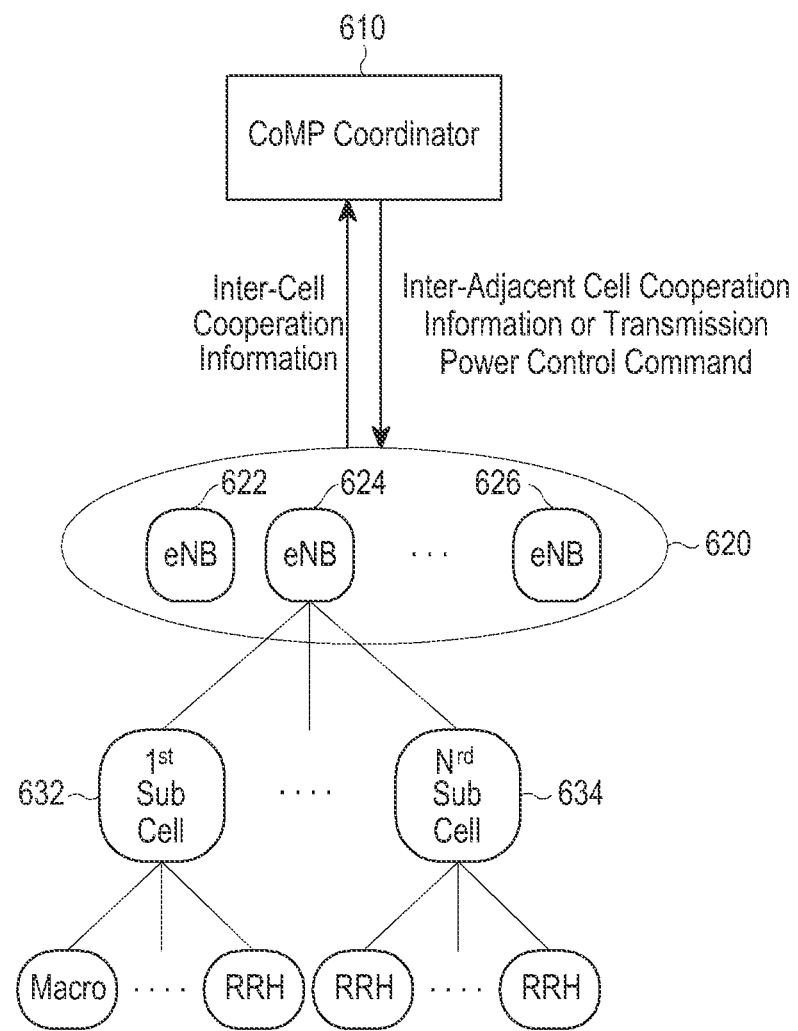
FIG. 6 is a view illustrating another example according to the fourth exemplary embodiment of the present invention.

FIG. 6 is a view illustrating another example according to the fourth exemplary embodiment of the present invention which is implemented in a scenario 4.

Referring to FIG. 6, a high-ranking coordinator (e.g., CoMP Coordinator) 610 shares inter-cell cooperation information reported to adjacent eNBs 620. In order to share the inter-cell cooperation information in real time, it is preferable to connect the CoMP Coordinator 610 to Sub-Coordinators 622, 624 and 626 which are respectively provided to each of the adjacent eNBs 620 by a medium capable of performing an optical communication.

More particularly, the Sub-Coordinators which are provided to correspond to first, second and third eNBs 622, 624 and 626 report inter-cell cooperation information of N sub cells 632 and 634 which they manage, to the CoMP Coordinator 610 in real time. At this time, the inter-cell cooperation information which is reported by the Sub-Coordinators includes long-term information and short-term information. The long-term information corresponds to SRS information, i.e., UL channel information, of serving UEs located in a service area of each eNB, and the short-term information corresponds to resource allocation information in a service area of each eNB.

As an example, the CoMP Coordinator 610 collects inter-cell cooperation information which is reported from the Sub-Coordinator which is provided to each eNB 620, and generates inter-cell cooperation information among the adjacent cells which is provided to each eNB 620, based on the collected inter-cell cooperation information. For example, the CoMP Coordinator 610 generates the inter-adjacent cooperation information which is provided to the first eNB 622, based on the inter-cell cooperation information which is collected from the second eNB 624 and the third eNB 626, generates the inter-adjacent cooperation information which is provided to the second eNB 624, based on the inter-cell cooperation information which is collected from the first eNB 622 and the second eNB 626, and generates the inter-adjacent cooperation information which is provided to the third eNB 626, based on the inter-cell cooperation information which is collected from the first eNB 622 and the third eNB 624.

As another example, the CoMP Coordinator 610 can collect the inter-cell cooperation information which is reported from the Sub-Coordinators provided to each of the eNBs 620, and generate a TPC command to be provided to each eNB 602, based on the collected inter-cell cooperation information. For example, assuming that the first, second and third eNBs 622, 624 and 626 are mutually adjacent to one another, the CoMP Coordinator generates the TPC command which is able to be provided to each of the first, second and third eNBs 622, 624 and 626, based on the inter-cell cooperation information which is collected from the first, second and third eNBs 622, 624 and 626.

The CoMP Coordinator 610 provides the inter-cell cooperation information among the adjacent cells which is generated to correspond to each eNB, or the TPC command to the Sub-Coordinators provided to the corresponding eNB, so that each Sub-Coordinator can control the uplink transmission power in the macro sectors which the Sub-Coordinator manages. It is previously described with reference to FIG. 5 that each Sub-Coordinator controls the uplink transmission power in each macro sector.

The inter-cell cooperation information among the adjacent cells which is provided to each Sub-Coordinator by the CoMP Coordinator 610 includes uplink channel information and resource allocation information in the adjacent cells. The TPC command which is provided to each Sub-Coordinator by the CoMP Coordinator 610 correspond to a command for instructing the Sub-Coordinators to respectively increase, decreases, or maintain the uplink transmission power in each of the N sub cells 632 and 634.

On the other hand, the N sub cells 632 and 634 respectively located in the corresponding eNB calculate an effective IoT and an effective SINR considering the inter-adjacent cooperation information and the inter-cell cooperation information thereof which are provided from the CoMP Coordinator 610 through the Sub-Coordinators, and perform a closed-loop power control.

As described above, if the eNBs share the resource allocation information with one another in real time in the scenario 4, the schedulers which respectively are subordinated to each of the Sub-Coordinators, can perform a cooperation scheduling in each of the plurality of cells.

As described above in detail, the present disclosure provides a scheme of controlling uplink transmission power by using inter-cell cooperation information (e.g., resource allocation, channel information, and the like) in a wireless communication system including a plurality of eNBs or RHHs, based on a CoMP which is an example of inter-cell cooperation communication schemes.

Here, in order to control the uplink transmission power in the wireless communication system using the CoMP technique, a path loss for the uplink is presumed, a target SINR is determined considering the presumed path loss for the uplink. Then, a control amount of power is determined to compensate for a difference between the determined target SINR and the presumed SINR for the uplink, and a TPC command corresponding to the control amount of power which is determined are included in a power control message and transmitted.

The inter-cell cooperation information used in the exemplary embodiments of the present invention include the resource allocation information of each cell which is shared by the plurality of cells, and the channel information such as a path transmission and the like. In the exemplary embodiments of the present invention, the effective value of NI, the effective value of IoT, and the effective value of SINR which are used for a power control can be presumed and managed, based on the inter-cell cooperation information.

Furthermore, in the exemplary embodiments of the present invention, the effective level of SINR, the effective level of NI, and the effective level of IoT are determined by applying a MMSE weight to a MIMO channel which is presumed from the SRS formed between the base station and the terminal based on MIMO as well as the resource allocation information of the terminal in the adjacent cells, which is shared by the plural cells. The respective terminals presume interference having an effect on the plurality of adjacent cells, considering the effective levels of SINR, NI and IoT which are determined. Then, variation of the transmission power for each terminal is determined, based on the presumed interference which has an effect on the plurality of adjacent cells. The variation of the transmission power for each terminal is able to be transmitted to the corresponding terminal.

Another exemplary embodiment of the present invention can be applied to an LTE-advanced wireless communication system based on the scenario 4. Herein, uplink transmission power and an intra-cell interference control in an uplink cell of an identical macro cell including an RRH, should be effectively determined by effectively sharing uplink scheduling information and channel information in a plurality of RRHs subordinated to an identical eNB, considering an effective IoT which can be calculated in real time.

Figure 7:
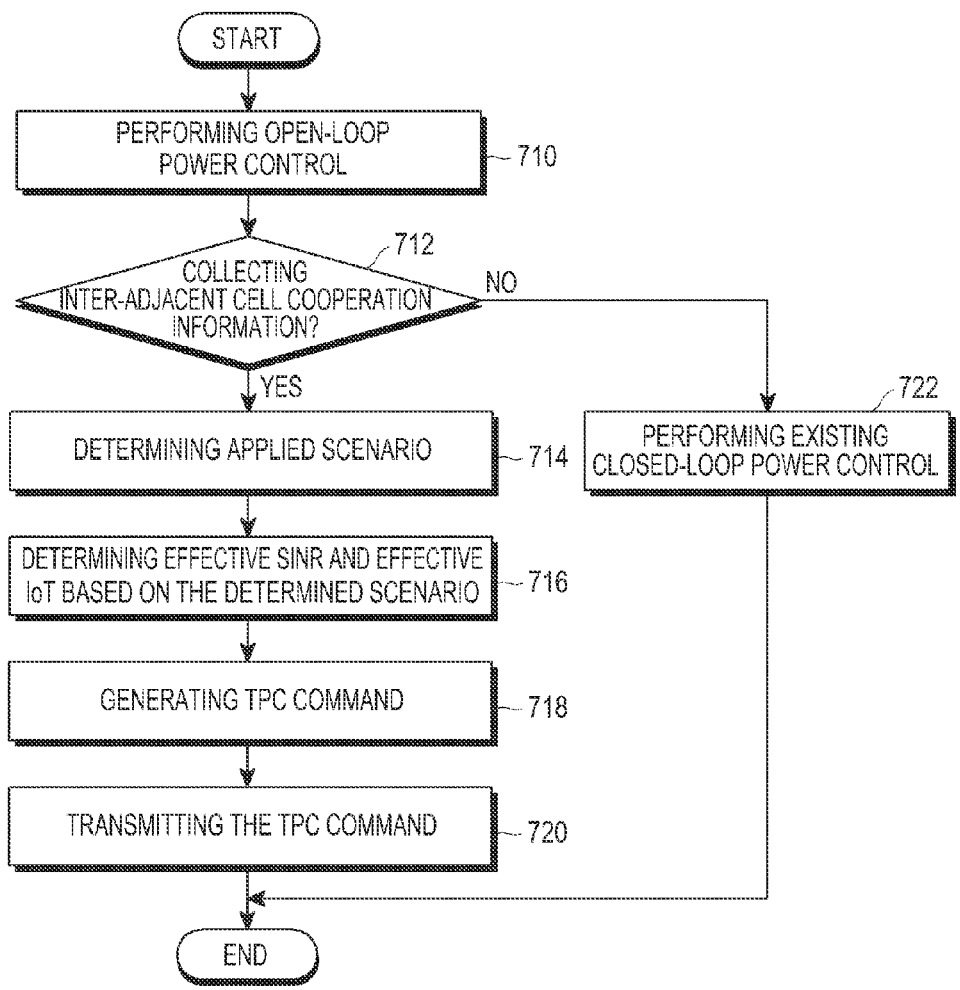
FIG. 7 is a flowchart illustrating a method of controlling an uplink transmission power in a wireless communication system according to an exemplary embodiment of the present invention.

FIG. 7 is a flowchart illustrating a method of controlling an uplink transmission power in a wireless communication system according to an exemplary embodiment of the present invention.

In FIG. 7, it is assumed that the base station performs an open-loop power control when a terminal comes in an initial contact with the base station, and in turn carries out a closed-loop power control. Especially, in exemplary embodiments of the present invention, there is provided a scheme of performing the closed-loop power control considering the inter-cell cooperation information of the adjacent cells.

On the other hand, it is configured that a subject performing an operation generates a TPC command in the description with reference to FIG. 7. Accordingly, the subject may be the CoMP Coordinator or the Sub-Coordinator provided to each eNB.

Referring to FIG. 7, in step 710, a coordinator performs an open-loop power control which is achieved in a wireless communication system. That is, the coordinator performs the open-loop power control in which an initial channel gain is set by a forward loss which is predicted based on a reception power of a terminal.

For example, the coordinator presumes an uplink path loss of a cooperation sub cell (e.g., RHH and the like) or a cooperation cell in order to control the open-loop power control. Each uplink path loss between each RRH and the terminal is calculated based on the SRS. As an example, the calculated uplink path losses of the terminals in a cell A can be respectively defined as PL1, PL2, PL3, . . . , and the calculated uplink path losses of the terminals in a cell B can be respectively defined as PL'1, PL'2, PL'3, . . . .

On the other hand, the uplink path loss can be calculated in a different way, according to a corresponding terminal, i.e., a location of the UE.

Firstly, if the UE is located at a center region in a macro cell, the rankings of RRHs subordinated to a serving macro cell are determined according to the SRS intensity of each RRH. A serving RRH having the largest SRS intensity is selected, and a path loss for the selected serving RRH is calculated and stored.

An RRH which is secondly selected according to the determined ranking, forms an identical group of a sub cell along with the serving RRH, calculates an effective path loss (1/(1/PL1+1/PL2)) corresponding to the sub cell, based on the calculated path loss for the serving RRH, and presumes an effective path loss in the uplink.

Next, where the UE is located at an edge of a macro cell, the rankings of RRHs subordinated to a serving macro cell are given according to the SRS intensity of each RRH. A path loss for the serving RRH which is selected based on the given ranking is calculated and stored, and then a second target macro cell is selected from the adjacent macro cells with reference to Reference Signal Received Power (RSRP). A desired RRH which has the largest reception signal intensity of SRS in the target macro cell is selected so as to form a sub cell in an identical group along with the serving RRH of the serving sector. An effective path loss (1/(1/PL1+1/PL1')) corresponding to a sub cell is calculated based on the path loss PL1' of the desired RRH and presumed as an uplink effective path loss.

In step 710, the coordinator performs the closed-loop power control which the present disclosure proposes, after a communication is performed by the initial channel gain caused by the open-loop power control.

In step 712, the coordinator determines whether inter-cell cooperation information on adjacent cells is collected. The collection of the inter-adjacent cooperation information has been previously described in detail. Therefore, a more detailed description of the collection of the inter-adjacent cooperation information will be omitted. The collection of the inter-adjacent cooperation information may be resource allocation information of a cooperation cell which is reported by each Sub-Coordinator or scheduler to the coordinator.

If the collection of the inter-adjacent cooperation information is not performed, the coordinator proceeds to step 722 to perform the existing closed-loop power control.

However, if the collection of the inter-cell cooperation is accomplished, the coordinator configures a target SINR. Of course, the configuration of the target SINR should be achieved in order to perform the existing closed-loop power control, but it is limited and described that the configuration of the target SINR is performed for a power control proposed in the present disclosure.

The coordinator configures the target SINR by using the uplink effective path loss and an average NI. Here, the average NI is a value which is calculated by an average for an effective IoT each Radio Bearer (RB) (i.e., unit of resource allocation) in consideration with interference removal performance of a CoMP receiver.

In step 714, the coordinator determines a scenario for applying an uplink transmission power control scheme according to exemplary embodiments of the present invention if it is determined that the collection of the inter-cell cooperation information is achieved. For example, the scenario is determined among the scenarios 1, 2 and 4 defined as described above.

When the scenario to be applied is determined, the coordinator calculates an optimal antenna weight of an uplink receiver supporting a cooperation transmission by using the inter-cell cooperation information, especially SRS, which is collected in step 716. The coordinator measures an uplink effective SINR and an effective IoT from the real-time antenna weight.

In step 718, the coordinator compares the measured effective SINR and the effective IoT with a TPC threshold metric equation, and generates a TPC command based on the comparing result. The coordinator transmits the generated TPC command by using a PDCCH in step 720.

Hereinafter, a method of controlling uplink power according to an exemplary embodiment of the present invention will be described in detail.

For example, in a system such as an LTE system using a plurality of antennas, a receiver provided to a BS can receive an uplink signal using a plurality of antennas. As an example, a receiver of a BS satisfying the provision of 'Release 8' receives signals by using two antennas, and a receiver of a BS satisfying the provision of 'LTE-advanced' has four or eight antennas.

As described above, a received signal in a wireless communication system using a plurality of antennas can be defined as follows.

$$y_k^m = h_k^m x_k + \sum_{j \neq k} h_j^m x_j + n = h_k^m x_k + e_k^m + n^m \qquad \text{Equation 1}$$

In Equation 1, $y_k$ indicates a reception signal in a $k^{th}$ serving sector cell (sub cell), $x_k$ indicates a transmission signal of a terminal, to which a resource is allocated, in a $k^{th}$ serving sector cell (sub cell), and m denotes an $m^{th}$ antenna of the serving sector.

$$\sum_{j \neq k} h_j^m x_j$$

denotes a sum of signals which are received from a terminal to which a resource is allocated in other sector cells (sub cells) except for the $k^{th}$ cell.

When the reception signals defined by Equation 1 are expressed in vector form, they can be expressed as follows.

$$\overline{y_k} = \overline{h_k} x_k + \sum_{j \neq k} \overline{h_j} x_j + \overline{n} = \overline{h_k} x_k + \overline{e_k} + \overline{n} \qquad \text{Equation 2}$$

In Equation 2, $$\overline{y_k} = \begin{bmatrix} y_k^1 \\ \vdots \\ y_k^m \\ \vdots \\ y_k^M \end{bmatrix}, \overline{h_k} = \begin{bmatrix} h_k^1 \\ \vdots \\ h_k^m \\ \vdots \\ h_k^M \end{bmatrix}.$$

As an example, reception signals of terminals to which a resource is allocated from schedulers of first and second sector cells (sub cells) connected to a cooperation cell (CoMP) receiver can be expressed as follows.

$$\overline{y_{\{1,2\}}} = (\overline{h_1} x_1 + \overline{h_2} x_2) + \sum_{j \neq 1,2} \overline{h_j} x_j + \overline{n} = (\overline{h_1} x_1 + \overline{h_2} x_2) + \overline{e_{1,2}} + \overline{n} \qquad \text{Equation 3}$$

In Equation 3, $$\overline{y_{\{k,j\}}} = \begin{bmatrix} y_{\{k,j\}}^1 \\ \vdots \\ y_{\{k,j\}}^m \\ \vdots \\ y_{\{k,j\}}^{2M} \end{bmatrix}, \overline{h_k} = \begin{bmatrix} h_k^1 \\ \vdots \\ h_k^m \\ \vdots \\ h_k^{2M} \end{bmatrix}.$$

Here, $y_{\{k,j\}}$ indicates a signal which the $k^{th}$ and $j^{th}$ sector cells (sub cells) receive from a cooperation receiver, $x_k$ denotes a transmission signal of a terminal, to which resources are allocated, in the $k^{th}$ sector cell (sub cell), $h_k$ indicates a Single-Inductor Multiple-Output (SIMO) channel specification which a transmission signal of the terminal, to which the resource is allocated from the $k^{th}$ sector cell (sub cell), suffers.

The Equation 3 can be expressed as follows.

$$\overline{y_{\{1,2\}}} = [\overline{h_1}\ \overline{h_2}] \cdot \begin{bmatrix} x_1 \\ x_2 \end{bmatrix} + \sum_{j \neq 1,2} \overline{h_j} x_j + \overline{n} = [\overline{h_1}\ \overline{h_2}] \cdot \begin{bmatrix} x_1 \\ x_2 \end{bmatrix} + \overline{e_{1,2}} + \overline{n}$$

Equation 4

When transmission signals $x_1$ and $x_2$ of a terminal which are decoded are respectively indicated by vector form in Equation 4, a set of radio channels which are mapped can be expressed in a matrix form of $[\overline{h_1}\ \overline{h_2}]$.

In a case of the two cooperation cells, a reception signal in N cooperation cells can be generally expressed as follows.

$$\overline{y_{CoMP\_Set}} = \sum_{j = CoMP\_Set} \overline{h_j} x_j + \sum_{j \neq CoMP\_Set} \overline{h_j} x_j +$$

$$\overline{n} = [\overline{h_1}\ \ldots\ \overline{h_N}] \begin{bmatrix} x_1 \\ \vdots \\ x_k \end{bmatrix} + \overline{e_{CoMP\_Set}} + \overline{n}$$

Equation 5

In Equation 5, a set $$\begin{bmatrix} x_1 \\ \vdots \\ x_N \end{bmatrix}$$

of transmission signals of terminals which are located in a cooperation cell performing a decoding can be expressed by $x_{CoMP\_Set}$ having a vector form of 1×N.

At this time, a set $[\overline{h_1} \bullet \bullet \bullet \overline{h_N}]$ of radio channels which is mapped to the transmission signals of each terminal can be expressed by $H_{CoMP\_Set}$ having a vector form of M×N.

The $H_{CoMP\_Set}$ can be specifically generated from the inter-cell cooperation information which a receiver of a BS previously knows by sharing channel information of cooperation cells and resource allocation information in a CoMP set.

Information used in the Equation 5 can be classified into well-known information and unknown information. As an example, a sum $$\sum_{j \neq CoMP\_Set} \overline{h_j} x_j$$

of uplink interference of the terminals to which resources are not allocated from the CoMP_Set, but a non-cooperation cell can be expressed by a vector $\overline{e_{CoMP\_Set}}$ of M×1, and denotes a sum of interference of the non-cooperation cell which is received through (N×M) antennas. $e_{\{CoMP\_Set\}}^m$ denotes a sum of interference of the non-cooperation cell which is received through the $m^{th}$ antenna among the antennas.

These definitions can be expressed as follows.

Equation 6

$$\overline{y_{CoMP\_Set}} = H_{CoMP\_Set} \cdot x_{CoMP\_Set} + \sum_{j \neq CoMP\_Set} \overline{h_j} x_j + \overline{n} =$$

$$H_{CoMP\_Set} \cdot x_{CoMP\_Set} + \overline{e_{CoMP\_Set}} + \overline{n}$$

In Equation 6, $H_{CoMP} = [\overline{h_1} \bullet \bullet \bullet \overline{h_N}]$, and $$\overline{y_{CoMP\_Set}} = \begin{bmatrix} y_{\{CoMP\_Set\}}^1 \\ \vdots \\ y_{\{CoMP\_Set\}}^m \\ \vdots \\ y_{\{CoMP\_Set\}}^{N \times M} \end{bmatrix}, \overline{h_k} = \begin{bmatrix} h_k^1 \\ \vdots \\ h_k^m \\ \vdots \\ h_k^{N \times M} \end{bmatrix},$$

$$\overline{e_{CoMP\_Set}} = \begin{bmatrix} e_{\{CoMP\_Set\}}^1 \\ \vdots \\ e_{\{CoMP\_Set\}}^m \\ \vdots \\ e_{\{CoMP\_Set\}}^{N \times M} \end{bmatrix}.$$

Generally, a decoded signal r which is obtained by decoding a transmission signal x using an optimal receiver filter w for a received signal y and a linear receiver in a form of MMSE or MRC, can be expressed by Equation 7.

$$r = w^H y = w^H (hx + e + n)$$

Equation 7

Likewise, a decoded signal r which is decoded by a receiver filter w and similar to a transmission signal x can be indicated as a received signal from the cooperation cells.

For example, the received signal from the cooperation cells which is received in the cooperation cell receiver can be expressed by $r_{CoMP\_Set}$ as follows.

$$r_{CoMP\_Set} = W_{CoMP\_Set}^H \cdot (\overline{y_{CoMP\_Set}}) = W_{CoMP\_Set}^H \cdot x_{CoMP\_Set} + \overline{e_{CoMP\_Set}} + \overline{n})$$

Equation 8

A decoded signal vector $$\begin{bmatrix} r_1 \\ \vdots \\ r_N \end{bmatrix}$$

of the cooperation cells can be expressed by $r_{CoMP\_Set}$ in a vector form of 1×N. The linear receiver $W_{CoMP\_Set}$ can be expressed as a matrix value of M×N, and a set of vectors such as $\overline{w_k}$ of M by 1 which has a different value in each cooperation cell.

This can be expressed as follows.

$$W_{CoMP\_Set} = [\overline{w_1} \bullet \bullet \bullet \overline{w_k} \bullet \bullet \bullet \overline{w_N}]$$

Equation 9

On the other hand, a value of $\overline{w_k}$ which is applied to each cell configuring a cooperation cell can be expressed by a linear receiver of an MMSE form as follows.

$$\overline{w_k} = \overline{h_k} \cdot (H_{CoMP} \cdot H_{CoMP}^H + (Q+N) \cdot I)^{-1}$$

Equation 10

The Q is an average correlation value of an interference signal vector of the non-cooperation cell in a form of M by M, and can be expressed as follows.

$$Q = E\{\overline{e_{Non-CoMP}} \cdot (\overline{e_{Non-CoMP}})^H\}$$

Equation 11

Wherein N is an average correlation value of a thermal noise signal vector in a form of M by M, and can be defined by Equation 12.

$$N = E\{\bar{n} \cdot (\bar{n})^H\} \quad \text{Equation 12}$$

In other word, a signal received from the $k^{th}$ cell among the cooperation cells can be obtained by Equation 13.

$$r_k = \bar{w}_k^H \cdot (\overline{y_{CoMP\_Set}}) = \\ \bar{w}_k^H \cdot \left( \sum_{j=CoMP\_Set} \bar{h}_j x_j + \sum_{j \neq CoMP\_Set} \bar{h}_j x_j + \bar{n} \right) = \\ \bar{w}_k^H \cdot \left( \sum_{j=CoMP\_Set} \bar{h}_j x_j + \overline{e_{Non-CoMP}} + \bar{n} \right) \quad \text{Equation 13}$$

At this time, an optimal value of $\bar{w}_k$ of M by 1 which has a different value for the received signal $\overline{y_{CoMP\_Set}}$ of each cooperation cell can be calculated considering channels of the plurality of cells, so as to maximize the interference removal performance so that the cooperation cell interference can be minimized.

In other words, in the cooperation cell technique, the interference removal performance can be maximized by sharing channel information and resource allocation information of the cooperation cells. In addition, a linear receiving weight of each cooperation cell can be calculated by an MMSE formula such as the above-mentioned formula.

The effective values of the SNIR, the NI and the IoT of the $k^{th}$ cooperation cell can be calculated by using a weight of each cooperation cell, and a linear calculation. An uplink power control can be performed by using the calculated values and Equation 14, considering the interference removal performance in a CoMP system.

$$r_k = \bar{w}_k^H \cdot (\overline{y_{CoMP\_Set}}) = \\ \bar{w}_k^H \cdot \left( \sum_{j=CoMP\_Set} \bar{h}_j x_j + \sum_{j \neq CoMP\_Set} \bar{h}_j x_j + \bar{n} \right) = \\ \bar{w}_k^H \cdot \left( \sum_{j=CoMP\_Set} \bar{h}_j x_j + \overline{e_{Non-CoMP}} + \bar{n} \right) \quad \text{Equation 14}$$

Likewise, in the CoMP system, a signal transmitted by a terminal to which a resource is allocated from each of the cooperation cells of the CoMP set is referred to as 'desired signal'. The 'desired signal' corresponds to $\bar{w}_k^H \cdot \bar{h}_k x_k$, and interference which the terminal suffers from the cooperation cells corresponds to $$\bar{w}_k^H \cdot \left( \sum_{j=CoMP\_Set} \bar{h}_j x_j - \bar{h}_k x_k \right).$$

The interference signal from the cooperation cell corresponds to $$\bar{w}_k^H \cdot \left( \sum_{j=CoMP\_Set} \bar{h}_j x_j - \bar{h}_k x_k \right) = \bar{w}_k^H \cdot (\overline{i_{CoMP}}),$$

and the interference signal from the non-cooperation cell corresponds to $$\bar{w}_k^H \cdot \left( \sum_{j \neq CoMP\_Set} \bar{h}_j x_j \right) = \bar{w}_k^H \cdot (\overline{e_{Non-CoMP}}).$$

Here, $$\overline{i_{CoMP}} = \left( \sum_{j=CoMP\_Set} \bar{h}_j x_j - \bar{h}_k x_k \right).$$

An SINR which can be obtained from signals output from the receiver can be expressed by a ratio of a power intensity of the 'desired signal' to a signal intensity of a 'non-desired signal'. That is, the SINR can be expressed by Equation 15.

$$\text{Effective\_SINR}_k = \frac{\bar{w}_k^H \cdot \bar{h}_k \cdot \bar{h}_k^H \bar{w}_k}{\bar{w}_k^H (I + Q + N) \bar{w}_k} \quad \text{Equation 15}$$

In Equation 15, I is the Covariance Matrix of a vector signal $\overline{i_{CoMP}}$ which is a sum of interference signals received from the cooperation cells by m antennas in $k^{th}$ cell, and indicates a matrix of M×M.

I can be calculated as $I = \overline{i_{CoMP}} \cdot \overline{i_{CoMP}}^H$ by reflecting real time interference in Equation 15. In Equation 15, $\bar{w}_k^H \cdot \overline{i_{CoMP}} \cdot \overline{i_{CoMP}}^H \bar{w}_k$ corresponding to a denominator indicates residual interference passing through an interference removing filter. Accordingly, the residual interference can be reflected to values of the effective SINR, the effective NI and the effective IoT.

In Equation 15, Q is the Covariance Matrix of a vector signal $\overline{e_{Non-CoMP}}$ which is a sum of interference signals received from the non-cooperation cells by m antennas in the $k^{th}$ cell, and indicates a matrix of M×M.

The Q is calculated by Equation 15 as $$Q = E\{\overline{e_{Non-CoMP}} \cdot \overline{e_{Non-CoMP}}^H\}.$$

Here, a formula of E{ } denotes a calculation of obtaining an average.

N is a Covariance Matrix of a vector signal n which corresponds to thermal noise and is received by m antennas in the $k^{th}$ cell, and is depicted as a matrix of M×M. N is expressed as $N = E\{nn^H\}$ Typically, since the thermal noise is White Gaussian Noise, mathematically $N = \sigma 2I$, wherein $\sigma 2$ indicates noise variance of each antenna, and I is the Identity Matrix of M×M.

Especially, the NI indicating noise and interference can be defined by Equation 16.

$$\text{effective\_NI}_{RB} = w^H(I + Q + N)w \quad \text{Equation 16}$$

The IoT of each RB can be expressed by Equation 17.

$$\text{effective\_IoT}_{RB} = \frac{\text{effective\_NI}}{N} = \frac{w^H(I + Q + N)w}{w^H N w} \quad \text{Equation 17}$$

On the other hand, a process of controlling a closed-loop power in an LTE-Advanced system is as follows.

Firstly, a target SINR is determined.

More particularly, the BS presumes a path loss by using a PHR and an SRS transmitted from a terminal, and calculates a target SINR by using the presumed path loss.

As an example, the target SINR in an Open-Loop Power Control (OLPC) can be defined by Equation 18.

$$\text{Target}_{SINR_{cB}} = TxPowerRB - Pathloss - Avg\_effective\_NI\_dB \quad \text{Equation 18}$$

In Equation 18, TxPowerRB is transmission power per each RB which a terminal uses during a transmission of PHR, and NI_dB is an average of noise and interference which is measured for each RB. The TxPowerRB can be expressed by Equation 19.

$$\text{Avg\_effective\_NI\_dB} = E\{E\{\text{effective\_NI}_{RB}\}\} \quad \text{Equation 19}$$

In Equation 19, effective_$NI_{RB}$ denotes $w^H(I+Q+N)w$, in which a value of the effective NI from which interference is removed in real time by a value w of the optimal MMSE weight is reflected. That is, firstly an average for a RB resource is obtained, and secondly an equalization for a time area is performed so that Avg_effective_NI_dB has an independent average value for each cell (sub cell) defined by Equation 20.

$$TxPowerRB = Po\_pusch + \alpha * Pathloss \quad \text{Equation 20}$$

In Equation 20, α is a compensation ratio of a path loss in a fractional power control, of which a default value is 0.8. Po_pusch is a level of a target reception per the RB in OLPC, of which a fixed value is −80 dBm, and the path loss can be calculated by a difference between transmission power and a reception level as follows.

In Equation 20, EST_TxPowerRB indicates transmission power for each RB of a terminal which is presumed by using a value of a headroom reported when the BS receives a PHR. The EST_TxPowerRB can be calculated by Equation 21.

$$EST\_TxPowerRB = \min(MaxEIRP, MaxEIRP - PHR\_dB) - 10*\log10(PHR\_TxRB\_Num) \quad \text{Equation 21}$$

In Equation 19, PHR_TxRB_Num denotes the number of RBs transmitted when PHR is transmitted, and MaxEIRP indicates a maximum transmission power of a terminal. Actual transmission power of the terminal is determined by a difference of the residual headroom after resource of MaxEIRP and PHRTxRB is transmitted.

Secondly, received Estimated_SINR_dB is calculated.

For example, a received SINR can be presumed by obtaining an average for continuous RB resource of an uplink based on an effective SINR for the RB obtained from a MIMO channel value and resource allocation information which can be known from an SRS.

The received SINR is used as $k^{th}$ real-time Estimated_UE_SINR_dB for each sub frame defined by Equation 22.

$$\text{Estimated\_UE\_SINR\_dB} = E\{\text{Effective\_}SINR_k\} \quad \text{Equation 22}$$

Thirdly, TPC_amount is calculated.

For example, a difference between a presumed target_SINR_dB and Estimated_UB_SINR_dB is calculated by Equation 23 in order to determine a TPC command which is transmitted to a terminal.

$$TPC\_amount = Target\_SINR\_dB - Estimated\_UE\_SINR\_dB \quad \text{Equation 23}$$

TPC amount can be obtained by Equation 24 with reference to Equation 23.

$$TPC\_amount = Po\_pusch + (\alpha-1)*UL\_Pathloss - Avg\_Effective\_NI\_dB - Estimated\_UE\_SINR\_dB \quad \text{Equation 24}$$

Fourthly, the TPC command is determined.

For example, the TPC command is determined by Equation 25 according to a value of TPC amount which is obtained.

if TPC_amount>+3 dB

TPC_command=+3 dB else if TPC_amount>+1 dB

TPC_command=+1 dB else if TPC_amount<−1 dB $$TPC\_command = -1\ dB \quad \text{Equation 23}$$

As another example, as a result of power control through an Inter-Cell Interference Coordination (ICIC), the TPC command are not transmitted to the terminal, but reflected as an offset value for the target SINR in the closed-loop power control, as expressed by Equation 26.

$$TPC\_amount = (Target\_SINR\_dB + ICIC\_offset\_dB) - Estimated\_SINR\_dB = (Target\_SINR\_dB - Estimated\_UE\_SINR\_dB) + ICIC\_offset\_dB \quad \text{Equation 26}$$

In another example as described above, the ICIC is used for an inter-cell interference control. Where the ICIC and the closed-loop power control of LTE are operated together, the power controlled by the ICIC can be prevented from being returned by the closed-loop power control. This appearance is generated because it is impossible to distinguish a change of the power by the ICIC from a change of the closed-loop power by the TPC.

It will be appreciated that the exemplary embodiments of the present invention may be implemented in the form of hardware, software, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (for example, a computer), regardless of whether the software can be deleted or rewritten.

It will be appreciated that the method for controlling the apparatus for measuring coordinates of input from an input means according to the present disclosure may be implemented by a computer or a portable terminal including a controller and a memory, and that the memory is an example of a non-transitory machine-readable storage medium suitable for storing a program or programs including instructions for implementing the exemplary embodiments of the present invention. Accordingly, a program including codes for implementing an apparatus or a method which is claimed in any claim of this specification, and a storage medium which stores this program and is readable by a machine (a computer or the like) are. Also, this program may be electronically conveyed via any medium such as a communication signal transmitted through a wired or wireless connection, and the exemplary embodiments of the present invention suitably includes equivalents of this program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling uplink transmission power of a plurality of access nodes using a radio resource control apparatus, in a wireless communication system including the plurality of access nodes which transmit signals to a terminal by an inter-cell cooperation, the method comprising:
   receiving, by the radio resource control apparatus, inter-cell cooperation information, the inter-cell cooperation information including uplink channel information and resource allocation information of the terminal located in a service area of each of the plurality of accesses nodes, from each of the plurality of access nodes;
   generating, by the radio resource control apparatus, an uplink transmission power control command of any of the plurality of access nodes based on the inter-cell cooperation information received from each of the plurality of access nodes; and
   transmitting the generated transmission power control command to any of the plurality of access nodes by the radio resource control apparatus,
   wherein the plurality of access nodes includes at least one cooperation access node.

2. The method as claimed in claim 1, wherein according to a location where the radio resource control apparatus is disposed in the wireless communication system, any of the plurality of access nodes and the at least one cooperation access node comprise one of a base station including a plurality of macro sectors, a plurality of sector cells included in the base station, and a plurality of sub cells included in the base station, the sub cells included in the base station respectively include a Radio Remote Head (RRH), or a combination of an RRH and a macro cell.

3. The method as claimed in claim 2, wherein the generating of the uplink transmission power control command comprises:
   calculating a weight of an optimal antenna of an uplink receiver for receiving signals transmitted by the inter-cell cooperation through an uplink of any of the plurality of access nodes based on inter-cell cooperation information received from any of the plurality of access nodes and inter-cell cooperation information received from at least one cooperation access node among inter-cell cooperation information received from each of the plurality of access nodes;
   measuring an effective signal to interference plus noise ratio (SINR) and an effective interference over thermal (IoT) which correspond to any of the plurality of access nodes by using the calculated antenna weight; and
   generating the uplink transmission power control command based on the effective SINR and the effective IoT which are measured.

4. The method as claimed in claim 3, wherein the generating of the uplink transmission power control command comprises:
   allowing the terminal to estimate interference which has an effect on the at least one cooperation access node and any of the plurality of access nodes considering based on an effective noise and interference (NI), the effective SINR and the effective IoT which are measured;
   determining a variation of a transmission power of the terminal based on an extent of the presumed interference; and
   generating the uplink transmission power control command of any of the plurality of access nodes in order to obtain the determined variation of the transmission power.

5. An apparatus for controlling uplink transmission power of a plurality of access nodes, in a wireless communication system including the plurality of access nodes which transmit signals to a terminal by an inter-cell cooperation, the apparatus comprising:
   a receiver which receives inter-cell cooperation information, the inter-cell cooperation information including uplink channel information and resource allocation information of the terminal located in a service area of each of the plurality of access nodes, from each of the plurality of access nodes;
   a processor which generates an uplink transmission power control command of any of the plurality of access nodes based on the inter-cell cooperation information received from each of the plurality of access nodes; and
   a transmission unit which transmits the transmission power control command generated by the processor to any of the plurality of access nodes,
   wherein the plurality of access nodes include at least one cooperation access node.

6. The apparatus as claimed in claim 5, wherein according to a location where the radio resource control apparatus is disposed in the wireless communication system, any of the plurality of access nodes and the cooperation access node comprise one of a base station including a plurality of macro sectors, a plurality of sector cells included in the base station, and a plurality of sub cells included in the base station, and the sub cells included in the base station respectively include a radio remote head (RRH), or a combination of an RRH and a macro cell.

7. The apparatus as claimed in claim 6, wherein the processor calculates a weight of an optimal antenna of an uplink receiver for receiving signals transmitted by the inter-cell cooperation through an uplink of any of the plurality of access nodes based on inter-cell cooperation information received from any of the plurality of access nodes and inter-cell cooperation information received from at least one cooperation access node among inter-cell cooperation information received from each of the plurality of access nodes, measure an effective signal to interference plus noise ratio (SINR) and an effective interference over thermal (IoT) which correspond to any of the plurality of access nodes by using the calculated antenna weight, and generates the uplink transmission power control command based on the effective SINR and the effective IoT which correspond to any of the plurality of access nodes.

8. The apparatus as claimed in claim 7, wherein the processor allows the terminal to estimate interference which has an effect on the at least one cooperation access node and any of the plurality of access nodes based on effective noise and interference (NI), the effective SINR and the effective IoT which are measured, determines a variation of a transmission power of the terminal based on an extent of the presumed interference, and generates the uplink transmission power control command of any of the plurality of access nodes in order to obtain the determined variation of the transmission power.

9. A method of controlling uplink transmission power of a plurality of access nodes using a radio resource control apparatus, in a wireless communication system including the plurality of access nodes which transmit signals to a terminal by an inter-cell cooperation, the method comprising:

receiving, by the radio resource control apparatus, inter-cell cooperation information, the inter-cell cooperation information including uplink channel information and resource allocation information of the terminal located in a service area of each of the plurality of access nodes, from each of the plurality of access nodes;

configuring, by the radio resource control apparatus, inter-adjacent cell cooperation information by using the inter-cell cooperation information received from at least one cooperation access node which provides an inter-cell cooperation transmission for a certain terminal with any of the plurality of access nodes; and transmitting, the configured inter-adjacent cell cooperation information to any of the plurality of access nodes by the radio resource control apparatus, wherein the plurality of access nodes include at least one cooperation access node.

10. The method as claimed in claim 9, wherein according to a location where the radio resource control apparatus is disposed in the wireless communication system, any of the plurality of access nodes and the at least one cooperation access node comprise one of a base station including a plurality of macro sectors, a plurality of sector cells included in the base station, and a plurality of sub cells included in the base station, the sub cells included in the base station include a Radio Remote Head (RRH), or a combination of an RRH and a macro cell, respectively.

11. An apparatus for controlling uplink transmission power of a plurality of access nodes, in a wireless communication system including the plurality of access nodes which transmit signals to a terminal by an inter-cell cooperation, the apparatus comprising:

a receiver which receives inter-cell cooperation information, the inter-cell cooperation information including uplink channel information and resource allocation information of the terminal located in a service area of each of the plurality of access nodes, from each of the plurality of access nodes;

a processor which configures a inter-adjacent cell cooperation information by using the inter-cell cooperation information received from at least one cooperation access node which provides an inter-cell cooperation transmission for the terminal with any of the plurality of access nodes; and a transmission unit which transmits the inter-adjacent cell cooperation information configured by the processor to any of the plurality of access nodes, wherein the plurality of access nodes include at least one cooperation access node.

12. The apparatus as claimed in claim 11, wherein according to a location where the radio resource control apparatus is disposed in the wireless communication system, any of the plurality of access nodes and the cooperation access node comprise one of a base station including a plurality of macro sectors, a plurality of sector cells included in the base station, and a plurality of sub cells included in the base station, and the sub cells included in the base station include a radio remote head (RRH), or a combination of an RRH and a macro cell, respectively.

* * * * *